Patented Dec. 17, 1935

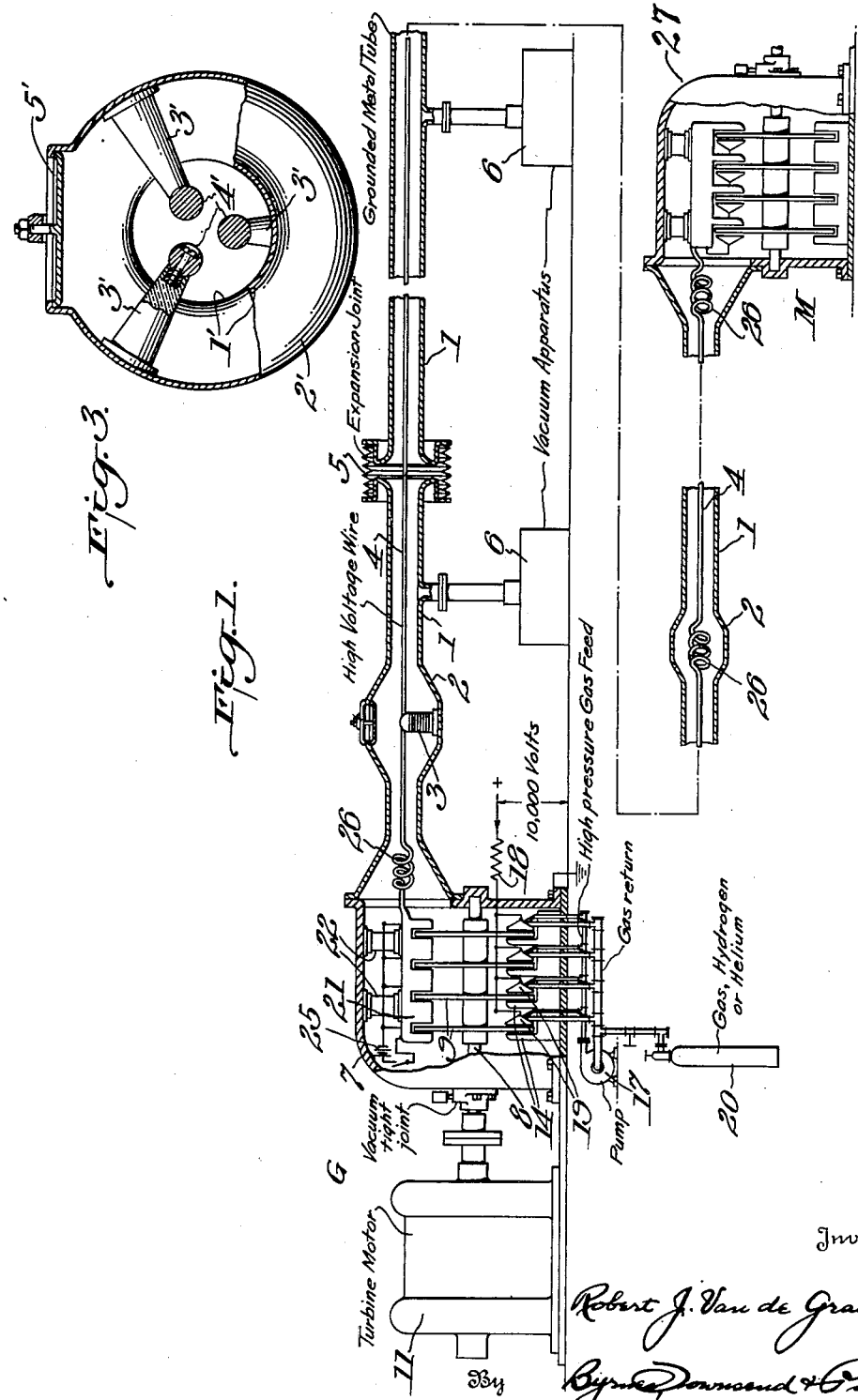

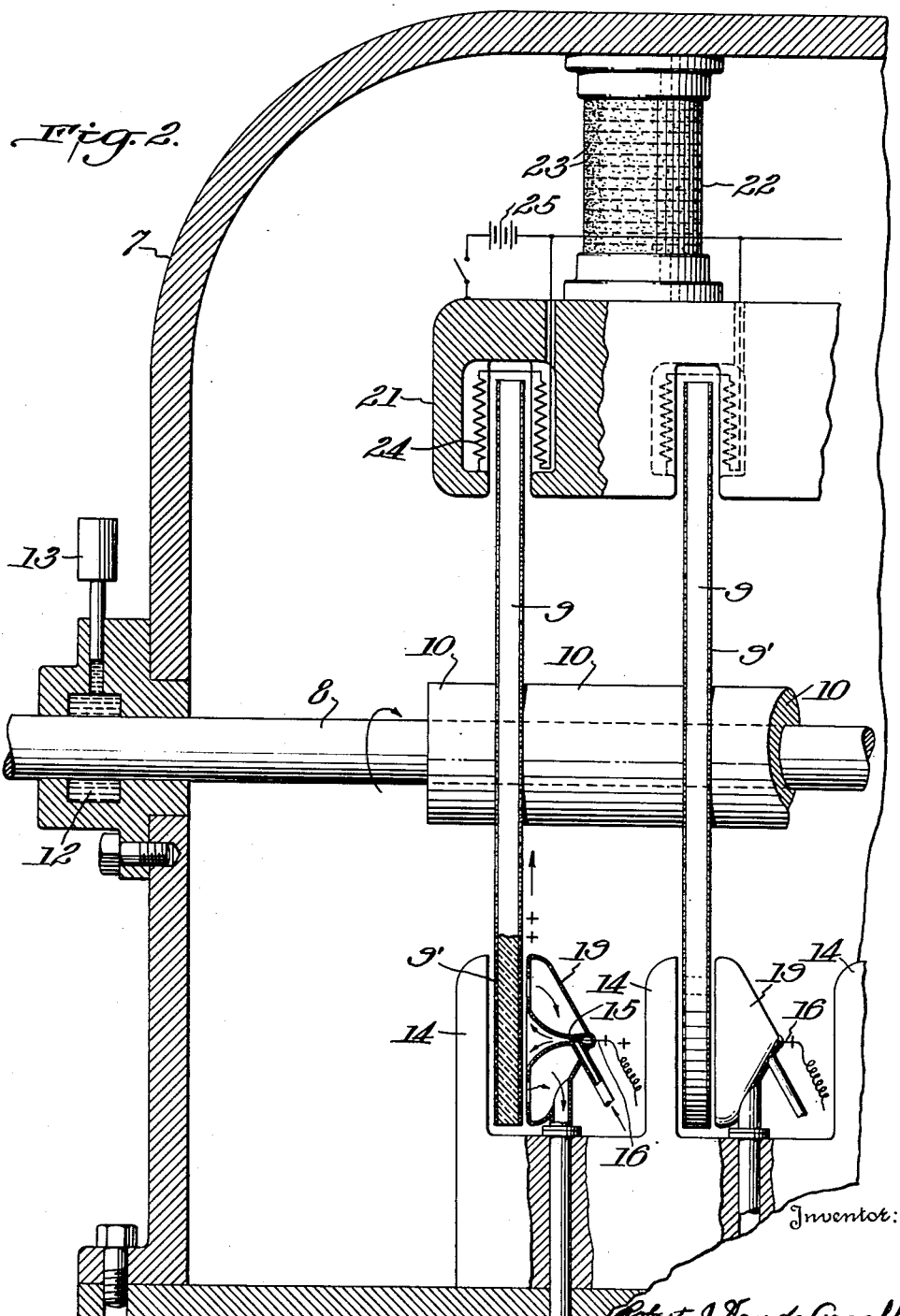

2,024,957

UNITED STATES PATENT OFFICE 2,024,957

ELECTRICAL TRANSMISSION SYSTEM

Robert J. Van de Graaff, Cambridge, Mass., assignor to Research Corporation, New York, N. Y., a corporation of New York Application July 5, 1932, Serial No. 620,964

12 Claims. (Cl. 171—97)

This invention relates to high voltage power transmission systems and particularly to a system for the generation, transmission and utilization of power at direct current voltages of an order substantially in excess of voltages heretofore employed either in connection with direct or alternating current.

One object is to provide a complete power transmission system, free from danger to life and property, high in overall efficiency, and one by which electric power can be generated and transmitted economically for utilization over unlimited distances.

The present methods of transmitting electricity for long distances by alternating current through overhead wires are attended, as is well known, with inherent difficulties, hazards and limitations, both economic and physical. These are due to line resistance losses, leakage, corona losses, cost of equipment, up-keep, fire hazards, danger to life, power factor correction, wattage or charging current required by the line, transformer and other losses, and numerous other factors and conditions. These conditions have limited the voltages at which it has been economical and practicable to transmit alternating current under the most favorable conditions to not exceeding 250,000 volts and for distances not exceeding 300 miles. This limitation of distance has been a critical barrier in the exploitation of remote electrical power sources.

To avail of the insulating qualities of an evacuated space, power transmission through a conductor placed in but spaced from the walls of an evacuated conduit has been proposed, such transmission to be by means of direct current, since alternating current transmission under these conditions is impracticable due to the electrostatic capacity of such an organization and the complications resulting therefrom.

Such proposals, however, have failed to make provision for the practicable transmission of power at the high voltages of the order herein contemplated and which become desirable for the economic transmission of power over long distances.

Such proposals, furthermore, have made no provision for the generation of direct current and its application to the transmission line under conditions such that high voltages of the order herein contemplated may be applied to the transmission line and the possible capacity thereof for high voltage transmission may be utilized.

The present invention has, among other objects, the provision of conductors separated by a vacuous space which are so related, and to which positive and negative potentials are so applied, that the transmitting capacity of the line for the highest possible voltage may be availed of.

As to the transmission line itself, where direct current is used with the aid of a vacuous insulating space, it is obvious that a high vacuum should be maintained within the enclosure. It is also desirable that the exposed surfaces within the enclosure should be subjected to an "out-gassing" treatment to remove residual gases. That alone, however, is insufficient to avail of high voltage transmission.

To secure such results I have found it desirable to employ two conductors constituting the two sides of the line and separated by the vacuous space referred to, their geometrical design and relationship being such as to concentrate the electric field on one conductor and to attenuate or spread it out over a relatively large area on the other. To the first conductor there should be connected the positive terminal of the direct current generating apparatus to maintain it as the anode or positive conducting surface, and to the second conductor there should be connected the negative terminal of the direct current generating apparatus to maintain it as the cathode or negative conducting surface. This results in providing a voltage gradient at the negative conductor or cathode substantially lower than at the positive conductor or anode. Since the positive or anode conductor surface in vacuum is capable of withstanding, without spontaneous discharge of electricity from that surface, very much higher gradients than the negative or cathode conductor surface, the harmful effect of electron extraction from the cathode is rendered substantially negligible and abnormally higher voltages than otherwise may be utilized.

More specifically, I have found that a very suitable design for a transmission line based on the above principles, and for operation at abnormally high voltages too, consists of a large cylindrical, highly evacuated conducting tube, inside of which and running along its axis is an insulated metal rod of either solid or hollow construction. This axial or central conducting rod is spaced from the container walls by insulators having controlled or predetermined voltage gradients. The central rod is then so connected to the source of electro-motive force that it becomes the high voltage electrode maintained at a positive potential to constitute the anode, while the tube, which may be of metal, forms the grounded negative return conductor of the transmission line. By making the central conductor positive with reference to the surrounding tubular conductor, the voltage gradient at the surface of the latter is lowered to the value at which electron emission from its surface does not take place, that is, so that there is no loss of energy or breakdown due to such field currents. The dimensions of the tube and rod must be very definitely selected in order that at the abnormally high voltage of operation there will not be breakdowns due to ion emission from the cathode surface. The effect of dimensions will now be further outlined.

Appropriate dimensions for a system in which a round conductor is placed axially in a tubular conductor of circular cross-section may be determined by the formula for the voltage gradient E at a point at a distance $x$ from the axis:

$$E = \frac{V}{x \log_e \frac{r^2}{r'}}$$

where V is the total voltage between the conductors, $r'$ is the radius of the inner or rod conductor, and $r^2$ is the internal radius of the outer or tubular conductor. For example, the above relationship indicates that the voltage gradient at the surface of the metal rod mentioned in the preceding discussion, will be greater than the gradient on the inside of the large cylindrical tube. The exact difference in gradient at these two surfaces will depend on the relative radii of the two concentric conductors, the distance of the axis to the internal surface of the outside conductors, and on the voltage between the conductors. As certain advantages of the invention are more pronounced as the direct current transmission voltage is increased to higher values, data relative to an extremely high voltage will be given by way of example, but it is to be understood that the invention is not restricted to the transmission of current at the high voltage of this example.

It may here be noted that, prior to my recent developments in electrostatic generators, direct current voltages above 750,000 volts had never been obtained. It is now possible, however, to generate currents of substantial magnitude and at voltages of the order of upward of 1,000,000 volts, and to design electrostatic motors for operation at these high voltages.

An appreciable discharge of electricity between two vacuum-insulated high voltage conductors may arise from at least two causes, i. e., ionization of the residual gas molecules in the evacuated space, and a pulling out of charged particles from the electrodes under the electrical stress or voltage gradient. General experience and special laboratory tests have shown that, with the relationship of the positive and negative conductors hereinbefore referred to, there will be no appreciable discharge from these causes when, with a transmission system as stated above, the pressure in the evacuated space between the electrodes is not greater than about $10^{-5}$ millimeters of mercury, and the voltage gradients are of the magnitudes noted above. At this pressure, the residual gas molecules are so few and so distantly spaced that an electron which might free itself from the metal of one electrode would not, in its high velocity travel to the other electrode, collide with a gas molecule and thus liberate free electric charges.

Assuming that direct current is to be transmitted, with 5,000,000 volts on the positive or inner conductor, the above formula will show that safe voltage gradient at the surface of the negative conductor (the cylindrical tube) will obtain when the rod conductor has a diameter of 4 centimeters and the tubular conductor has an internal diameter of 45 centimeters. The computed value of the voltage gradient at the positive electrode or anode is then about 1,000,000 volts per centimeter, and that at the cathode is 92,000 volts per centimeter. At a gradient of 92,000 volts per centimeter there will be no danger due to breakdown of the conductor from field currents, that is, extraction of negative ions from the negative conductor surface.

The tubular container or negative electrode must, of course, be non-porous and free from internal projections and rough spots to avoid high local voltage gradients. Rolled or drawn steel tubing will be satisfactory, but cast metal would probably be impractical. As in known pipe line constructions, the tubular container would be made in sections which, after testing, are installed with joints welded by the atomic hydrogen process and, at appropriate intervals, with expansion joints. If the system is of any substantial length, vacuum pumps are installed at intervals to maintain the desired low pressure and, preferably, parallel tubes with separate vacuum pumps are provided, the lines being sectionalized and switch chambers being provided to permit the cutting out of a section for inspection or repair.

The extreme efficiency of a 5,000,000 volt direct current line of the dimensions stated will be apparent from a consideration of the losses in transmission. In order to strikingly exemplify the ultimate possibilities of vacuum transmission lines under conditions most contrasting with the limitations of present systems, let us go the limit in length and assume a line 13,000 miles long as this would be sufficient to join (by a great circle) any two points on the earth's surface. If the central rod, 4 centimeters in diameter, were of aluminum, its resistance for the above length would be 500 ohms. If the line transmitted the enormous power or 1,000,000 kilowatts from one end to the other, the current required at 5,000,000 volts would be 200 amperes, and the voltage drop and $I^2R$ loss would each be only 2.0%. Obviously, no known transmission line, as heretofore proposed, can even remotely approach the performance here outlined.

Some leakage of current will take place through the insulators supporting the central rod within the tube. This loss will however be negligible, laboratory tests having shown that the leakage across an insulator 30 centimeters or more in height, and of an appropriate design as hereinafter described, would be less than $10^{-7}$ amperes per insulator when it is surrounded by an insulating vacuum. Assuming that an insulator were used at every 7 meters, the current loss over the 13,000 mile line would be less than 0.3 amperes.

Another object of the invention is the provision of means whereby the abnormally high voltage which the herein described transmission line is capable of carrying may be generated, delivered to and utilized from the line so that full useful capacity thereof may be availed of. Devices now commonly in use for generation, conversion and transformation of electric energy are of the electro-magnetic type, involving as a predominant characteristic the interaction of magnetic fields and the provision of closely associated insulated conductors. Such devices, due to their inherent limitations, are incapable of the power generation of direct current voltages of an order here contemplated or comparable to those which the described transmission line is capable of carrying.

Furthermore, if the current under the voltages indicated is generated, special provision must be made to deliver such current to the transmission line.

To avoid the limitations referred to and inherent in the usual type of electric power generation and conversion apparatus, the present invention contemplates the generation of direct current at abnormally high voltages in a vacuous space, preferably by electrostatic means, the delivery of the high voltage current directly to an evacuated transmission line, also through a vacuous space, as well as the maintenance of a motor or other translating device in a vacuous space and a delivery thereto of such current through an intervening vacuous space.

More specifically, in the illustrative embodiment of the invention, both the electrostatic generator at the generating end of the transmisssion line and an electrostatic motor at the conversion end of the line are positioned in a casing in which a vacuous condition is maintained. The hollow tubular conductor extends from the enclosing casing of the generator to the enclosing casing of the motor and is electrically connected to such casing so that the latter forms a part of the negative side of the transmission line and the vacuous spaces about the generator and motor merge without interruption into the vacuous space maintained within the hollow conducting tube of the transmission line and surround the connections between the central axial conductor thereof and the positive terminals of the generator and motor.

Provision is thus made to prevent ionic discharge from the positive terminals of the generator and motor or from the connections thereof to the air, the earth, or to the surrounding negative walls of the casing and conductor, and reliance on interacting magnetic fields is avoided, making it possible to generate and deliver to the transmission line the abnormally high voltages which it is capable of carrying.

For a better understanding of the invention, reference is had to the accompanying drawings, in which, Fig. 1 is a side elevation, with parts shown in section, of one form of transmission system embodying the invention, Fig. 2 is an enlarged and fragmentary sectional view of an electrostatic generator for the production of direct current at high voltages, and Fig. 3 is a transverse section through a three phase transmission line embodying the invention.

In the drawings, the generator station is identified, as a unit, by the reference character G, and is connected by a vacuum insulated transmission line to the distant station or substation which is identified, as a unit by character M.

The transmission line comprises the tubular container 1 which is provided, at intervals, with enlarged chambers such as the greater diameter sections 2, at which insulators 3 are mounted for supporting the central rod conductor 4, suitable manholes being provided to permit access to the insulators. The enlarged sections at the insulating supports permit the use of longer insulators and also compensate for the distortion of the electric field by the insulators. The insulators have a controlled voltage gradient, being preferably glass rods having copper films extending transversely of the rods similar to the insulators 23 hereinafter referred to, and may extend radially of the tube 1, as shown, or may be inclined or curved to increase their effective length.

Some of the sections of the conduit 1 have their ends outwardly flared, to provide enlarged end portions, with smooth rounded surfaces presented towards the high voltage conductor, that are joined by an expansible or corrugated sleeve 5. Similarly, suitable expansion joints, not shown, will be provided for the central conductor 4. Adjacent the end stations and at intervals along the line, efficient high speed, high capacity vacuum pump apparatus 6 is connected to the line to maintain the necessary low pressure.

Suitable apparatus for generating direct current at voltages of the order of 1 to 15 million volts may be of comparatively small dimensions when no gas is present between the parts of the generator, i. e., when high vacuum insulation is employed. A rotating disk construction, as illustrated, is to be preferred for both generator and motor units, but other types of electrostatic machines may be employed.

The generator casing or air tight housing 7 is provided with bearings for a shaft 8 on which a plurality of non-conducting disks 9 are mounted, the disks being accurately spaced by sleeves 10. The shaft 8 is driven by a suitable power device 11, for example, a steam turbine.

To provide a tight packing without high friction losses, the packing material 12 is a viscous fluid or plastic substance, such as grease or a grease-graphite mixture, which is held under superatmospheric pressure by a weighted piston 13 which slides in a vertical passage communicating with the packing space.

Features relating to the high vacuum seal for the transmission shaft are claimed in my co-pending application, Serial No. 756,368 filed December 6, 1934.

Positive charges are placed on the lower portions of the disks 9 by gas ionization and are removed or neutralized by negative charges at the upper portions of the disks. The disks are non-conductors and of such diameter that the resistance of the disk material prevents the charges from leaking across the disks as they are rotated. One suitable material for the disks is laminations of paper or fabric united into a rigid plate by a phenolic or other synthetic resin. The parts of the disk surfaces that carry the charges may be covered with a quartz or other refractory film 9' to prevent disintegration of the disk by the charges.

As shown in Fig. 2, the lower portions of the disks pass between a metallic boss or projecting plate 14 that is connected to and therefore grounded on the casing 7, and the positive charging or gas ionization unit. Each of these units comprises a nozzle 15 of insulating material which has a restricted opening in which a positive direct current electrode or wire 16 is located, and through which a stream of gas, such as hydrogen or helium is supplied from a pump 17. A ballast resistance 18 is included in the positive lead to the wires 16 and a suitable voltage source, of say 10,000 volts, is connected between the lead to resistance 18 and the negative potential plates 14 or ground. Positive charges placed on the gas molecules passing through the nozzle 15 are carried to and placed on the disks.

Although the gas is at a low pressure, say about 1 millimeter of mercury, this pressure is much higher than that enclosed within the casing 7 and it is therefore desirable to prevent this gas from entering the space enclosed by the casing. An annular chamber or cup 19 is positioned around the nozzle 15 and with its face very close to the surface of the rotating disk. By reducing the pressure in this chamber to about 0.01 millimeter by a connection to the inlet of a high-speed vacuum pump 17, the gas will be withdrawn from the surface in the immediate region of the disk and will thus not be able to escape into the space within the casing 7. The circulation of the gas is thus substantially restricted to the region within the ionization apparatus, and any loss which occurs through leakage past the inlet to the chamber 19 is replenished from a flask 20.

A collector or positive electrode 21 is suspended from the upper wall of the casing 7 by glass insulator columns 22 similar to the insulator posts 3 that support the conductor 4.

Leakage is guarded against and high breakdown characteristics are obtained when the insulators are formed of quartz, glass, material having the electrical characteristics of that known by the trade-name of "Pyrex", or other insulating substance. These have thin copper films 23 embedded therein to provide a controlled voltage gradient. Such insulators may be formed by depositing a thin copper film on one side of thin plates of the insulating material employed, for example plates 0.025 centimeters thick; building up a stack of such plates to the desired height, and heating the stack slowly in a vacuum furnace until the plates fuse together without distortion. The cylindrical surface of the stack is then ground and polished and a thin film of quartz is deposited on the polished surface by evaporation in vacuum, thus insulating the edges of the copper films and preventing electrons from being extracted from the edges, thus causing leakage in the form of field currents. The voltage gradient for such composite rods would be, for perfect constructions, the same as that for the Pyrex glass or about 3.2 million volts per centimeter. In actual practice, the composite rods can safely withstand one million volts per centimeter.

Features relating to material insulators in vacuum providing a controlled voltage gradient are claimed in my co-pending application, Serial No. 756,367, filed December 6, 1934.

The collector electrode 21 is recessed adjacent each face of the disk to receive filaments 24 that are heated to electron-emitting temperature by a suitable source, such as a battery 25, that is mounted within the casing 7. The filaments are electrically connected to the electrode 21 and therefore each electron or negative charge which is given up by the filament and carried away by the disk increases the positive charge on the electrode 21. The filaments are so located and operated that the negative charges will more than neutralize the positive charges brought up by the disk, thus leaving negative charges on the descending portion of the disk. These negative charges are neutralized by the gas ionization unit and, in addition, positive charges are attached to the ascending portion of the disk.

Protective devices, such as chokes 26, are provided at intervals along the transmission line to suppress current surges arising from unusual conditions.

The motor unit M may be of the same general construction as the generator, but with the gas ionization units at the top of the disks for placing positive charges at the upper portion of the disks, the ionizing potential being the positive potential of the conductor 4, and the filaments are located at the bottom or grounded portion of the evacuated motor casing 27.

As stated above, the invention is not limited to the transmission of direct current, either at present commercial potentials or at a potential of upward of a million volts, as vacuum insulation may be economically employed in an alternating current transmission system.

In congested areas where air insulation is impractical, it has been the practice to locate the main lines of a three phase power system underground, and to employ oil under pressure for insulation. The oil-insulated cables which have been used at alternating current voltages of the order of 150,000 volts are expensive to install and are both difficult and expensive to maintain in service.

The application of the invention to such alternating current power lines will materially reduce the difficulties which have been encountered in the use of fluid-filled cables. Each line of a three phase system may be located in an evacuated tube or container similar to the direct current system shown in Fig. 1, but the three lines are preferably located in a single evacuated tube.

As shown in Fig. 3, the preferred construction includes a hollow metallic container 1' of circular cross-section in which the three conductors 4' are symmetrically positioned and supported by insulators 3' that are mounted in enlarged sections or chambers 2'. Each enlarged section is provided with a cover plate 5' that may be removed to permit access to the insulators. The general construction and arrangement of the vacuum insulated transmission system will be apparent from a consideration of the direct current system shown in Fig. 1. Appropriate terminal chambers will be provided at the power plant and at substations when the generators and transformers are of the present air or oil insulated types.

In the design of an alternating current system, the dimensions and the spacing of the conductors must be such that the maximum voltage gradient on each conductor will be less than that which pulls electrons from a cathode surface, that is, produces field currents, since each conductor acts alternately as a cathode and as an anode. For high voltage systems, it is therefore of advantage to transmit direct current as this permits a very much higher voltage gradient at the surface of the anode or positive conductor.

I claim:

1. A transmission system for transmitting power by means of direct current at abnormally high voltages, comprising a pair of separated conductors, a source of direct current so connected as to impress on one conductor a positive potential and on the other a potential negative in relation to said first potential, the surfaces of said conductors being so positioned with respect to each other and of such shapes that the maximum voltage gradient at any part of the negative or cathode conductor surface is substantially lower than the average voltage gradient at the positive or anode conductor surface, and means for creating and maintaining a high vacuum in the space separating said conductors, whereby the harmful effect of electron emission from the cathode is rendered negligible and abnormally high voltages may be utilized.

2. A transmission system for transmitting power by means of direct current at abnormally high voltages, comprising a tubular conductor, a second conductor extending within and lengthwise the tubular conductor but separated therefrom, a source of direct current so connected as to impress on said second conductor a positive potential and on said tubular conductor a potential negative in relation to said first potential, the surfaces of said conductors being so positioned with respect to each other and of such shapes that the maximum voltage gradient at any part of the tubular negative conductor surface is substantially lower than the average voltage gradient at the surface of the positive second conductor, and means for creating and maintaining a high vacuum in the space separating said conductors, whereby the harmful effect of electron emission from the cathode is rendered negligible and abnormally high voltages may be utilized.

3. A transmission system for transmitting power by means of direct current at abnormally high voltages, comprising a cylindrical conductor, a second conductor extending within and axially lengthwise the tubular conductor but separated therefrom, a source of direct current so connected as to impress on said second conductor a positive potential and on said cylindrical conductor a potential negative in relation to said first potential, said cylindrical conductor being grounded, the surfaces of said conductors being so positioned with respect to each other and of such shapes that the maximum voltage gradient at any part of the cylindrical negative conductor surface is substantially lower than the average voltage gradient at the second positive conductor, and means for creating and maintaining a high vacuum in the space separating said conductors, whereby the harmful effect of electron emission from the cathode is rendered substantially negligible and abnormally high voltages may be utlized.

4. An energy converting and transmitting system, comprising a pair of conductors separated by a highly evacuated space, means enclosed within a highly evacuated space for converting mechanical energy into high potential direct current and so connected as to impress on one conductor a positive potential and on the other a potential negative in relation to said first potential, the surfaces of said conductors being so positioned with respect to each other and of such shapes that the maximum voltage gradient at any part of the negative or cathode conductor surface is substantially lower than at the positive or anode conductor surface, and means for creating and maintaining a high vacuum in the space separating said conductors and in the space surrounding said energy converting means.

5. A system for the generation and transmission for utilization over long distances of high voltage direct current energy, comprising vacuum enclosed means for producing high positive potential direct current energy, a conductor directly connected to said source of positive potential energy, a second conductor surrounding the first but separated therefrom and at a potential negative in relation to said first potential, these conductors being so positioned and shaped with respect to each other that the maximum voltage gradient at any part of the surface of the negative or cathode conductor is many times less than the average voltage gradient over the positive or anode conductor surface, and means for creating and maintaining a high vacuum in the space separating said conductors and in the space occupied by said high potential energy producing means.

6. A high voltage direct current power system, comprising, in combination, an electrostatic generator, a casing in which the same is enclosed, means for transmitting energy from said generator comprising a hollow conductor, a second conductor extending lengthwise within but spaced from said hollow conductor, means for impressing from said generator on said second conductor a positive potential and on said hollow conductor a potential negative in relation to said first potential, and means for establishing and maintaining a vacuous condition in said hollow conductor and in said generator casing.

7. A high voltage direct current power system, comprising, in combination, an electrostatic generator, a casing in which the same is enclosed, an electrostatic motor, a casing in which the latter is enclosed, conductors between said generator and motor comprising a hollow conductor, a second conductor extending lengthwise within but spaced from said hollow conductor, means for impressing from said generator on said second conductor a positive potential and on said hollow conductor a potential negative in relation to said first potential, and means for establishing and maintaining a vacuous condition in said hollow conductor, in said generator casing and in said motor casing.

8. A system for the conversion, transmission over long distances, and reconversion of mechanical energy into high potential direct-current energy and capable of energy flow in either direction, comprising a conductor enclosed within and separated from a second conductor, electrostatic means at each end of said first conductor capable respectively of converting mechanical energy into high potential direct-current energy and of converting high potential direct-current energy into mechanical energy, said arrangement being such that the potential of the first conductor is maintained positive relative to the second conductor and that the maximum voltage gradient at any part of the second conductor is substantially less than that of the first conductor, and means for creating and maintaining a high vacuum in the space surrounding said conductors and in the space occupied by said energy converting means.

9. A system for the generation, transmission, and conversion of high potential direct-current energy, comprising a source of high potential direct-current energy, a device for the utilization of said high potential direct-current energy, a conductor joining said source and said device, said conductor being surrounded by and separated from a second conductor and being maintained by said source at a potential positive in relation to the potential of said second conductor, and means for establishing and maintaining a high vacuum within said second conductor and about said source and said energy utilizing device.

10. The method of generating and transmitting for utilization at a distance direct current of abnormally high potential, which consists in electrostatically generating in a highly vacuous space high potential direct-current energy, maintaining a transmission conductor surrounded by a second conductor separated therefrom, maintaining the space between said conductors highly vacuous, and directly impressing on said first conductor from the direct-current energy electrostatically generated a positive potential relative to that of the second conductor.

11. The method of generating and transmitting for utilization at a distance direct current of an abnormally high potential, which consists in electrostatically generating high potential direct-current energy, directly impressing on a transmission conductor a positive potential from the direct-current energy so generated, maintaining said conductor surrounded by a second conductor spaced therefrom, maintaining the second conductor negative relative to the said first conductor, and establishing and maintaining a substantially continuous vacuous condition within said second conductor and around said first conductor and in the space in which said direct-current energy is generated.

12. The method of generating and transmitting for utilization at a distance direct-current power of abnormally high voltage and of high power capacity, which consists in mechanically transferring rotational energy into a highly vacuous casing, converting said mechanical energy into high potential direct-current energy by electrostatic means within said casing, maintaining a transmission conductor within and separated from a second highly evacuated conductor, and directly impressing on said first conductor a potential positive relative to that on said second conductor from the direct-current energy electrostatically generated.

ROBERT J. VAN DE GRAAFF.